(12) United States Patent
Nakayama

(10) Patent No.: US 11,157,121 B2
(45) Date of Patent: Oct. 26, 2021

(54) CONDUCTIVE MEMBER FOR TOUCH PANEL, TOUCH PANEL, AND CONDUCTIVE MEMBER

(71) Applicant: FUJIFILM Corporation, Tokyo (JP)

(72) Inventor: Masaya Nakayama, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/851,653

(22) Filed: Apr. 17, 2020

(65) Prior Publication Data

US 2020/0241701 A1 Jul. 30, 2020

Related U.S. Application Data

(63) Continuation of application No. PCT/JP2018/037577, filed on Oct. 9, 2018.

(30) Foreign Application Priority Data

Nov. 13, 2017 (JP) ............................. JP2017-218180

(51) Int. Cl.
*G06F 3/044* (2006.01)

(52) U.S. Cl.
CPC .......... *G06F 3/0445* (2019.05); *G06F 3/0446* (2019.05)

(58) Field of Classification Search
CPC ................. G06F 3/0446; G06F 3/0445; G06F 2203/04112
See application file for complete search history.

(56) References Cited

U.S. PATENT DOCUMENTS

| 2015/0177872 | A1* | 6/2015 | Kim ................... G06F 3/04166 345/174 |
| 2016/0274703 | A1 | 9/2016 | Satou |
| 2016/0320879 | A1 | 11/2016 | Hashida et al. |
| 2017/0192572 | A1* | 7/2017 | Han ................... G06F 3/04164 |

FOREIGN PATENT DOCUMENTS

| JP | 2015-106342 A | 6/2015 |
| JP | 2015-108884 A | 6/2015 |
| JP | 2015-191406 A | 11/2015 |

OTHER PUBLICATIONS

International Search Report Issued in PCT/JP2018/037577 dated Nov. 20, 2018.

(Continued)

*Primary Examiner* — Deeprose Subedi
(74) *Attorney, Agent, or Firm* — Jean C. Edwards, Esq.; Edwards Neils LLC

(57) ABSTRACT

In a conductive member in which a first electrode layer is positioned closer to a touch surface side compared to a second electrode layer, the first electrode layer includes a plurality of first sensing electrodes aligned in a first direction, each of the first sensing electrodes has a plurality of first electrode lines and has a first electrode width W1, the second electrode layer includes a plurality of second sensing electrodes aligned in a second direction perpendicular to the first direction, each of second sensing electrodes has a plurality of second electrode lines and a plurality of non-connection lines insulated from the plurality of second electrode lines, and has a second electrode width W2, and the second electrode width W2 is larger than the first electrode width W1.

13 Claims, 5 Drawing Sheets

(56) References Cited

OTHER PUBLICATIONS

Written Opinion Issued in PCT/JP2018/037577 dated Nov. 20, 2018.
International Preliminary Report on Patentability Issued in PCT/JP2018/037577 dated May 19, 2020.
Notice of Reasons for Refusal issued by the Japanese Patent Office dated Feb. 16, 2021, in connection with Japanese Patent Application No. 2019-552665.

* cited by examiner

CONDUCTIVE MEMBER FOR TOUCH PANEL, TOUCH PANEL, AND CONDUCTIVE MEMBER

CROSS-REFERENCE TO RELATED APPLICATIONS

This application is a Continuation of PCT International Application No. PCT/JP2018/37577, filed on Oct. 9, 2018, which was published under PCT Article 21(2) in Japanese, and which claims priority under 35 U.S.C. § 119(a) to Japanese Patent Application No. 2017-218180, filed on Nov. 13, 2017. The above applications are hereby expressly incorporated by reference, in their entirety, into the present application.

BACKGROUND OF THE INVENTION

1. Field of the Invention

The present invention relates to a conductive member for a touch panel including a sensing electrode constituted by a fine metal wire, and a touch panel comprising the conductive member for a touch panel.

2. Description of the Related Art

In recent years, in various electronic devices including portable information devices such as tablet computers and smart phones, a touch panel which is used in combination with display devices such as liquid crystal display devices and which performs an input operation on an electronic device by causing a finger, a stylus pen, or the like to be in contact with or be close to a screen is widespread.

In a touch panel, normally, a transparent insulating substrate is provided, and a sensing electrode for detecting a touch operation with a finger, a stylus pen, or the like is formed on the transparent insulating substrate.

The sensing electrode is usually formed of a transparent conductive oxide such as indium tin oxide (ITO), but is also formed of metal other than the transparent conductive oxide. Compared to the transparent conductive oxide, metal has advantages such as easy patterning, excellent flexibility, and a lower resistance value. In a touch panel including a conductive member constituted using a fine metal wire, it is possible to reduce a resistance value and a parasitic capacitance value compared to a touch panel of the related art configured using a transparent conductive oxide, and thus it is possible to improve detection sensitivity for a touch operation and this touch panel attracts attention.

For example, JP2015-108884A discloses a touch panel including a plurality of upper electrodes and a plurality of lower electrodes, which are constituted by fine metal wires. The plurality of upper electrodes and the plurality of lower electrodes have a mesh shape, and the plurality of upper electrodes are arranged on a viewing side with respect to the plurality of lower electrodes. In JP2015-108884A, in such a touch panel, by setting a ratio of an average value of mesh pitches of the upper electrode to an average value of mesh pitches of the lower electrode to be an integer of 2 or more and 8 or less, detection sensitivity for a touch operation and a visibility are ensured.

SUMMARY OF THE INVENTION

Incidentally, in general, in a touch panel including a sensing electrode constituted by a fine metal wire, as an electrode width of a sensing electrode disposed at a position far from a viewing side, that is, a sensing electrode disposed on a display device side becomes larger than that of a sensing electrode disposed on the viewing side, an electromagnetic wave from a display device generated due to an operation of the display device is shielded, and thus noise is less likely to be generated in a detection signal for a touch operation. Therefore, detection accuracy in a case where the display device is operated to drive the touch panel is increased. On the other hand, in a case where the electrode width of the sensing electrode is increased, a parasitic capacitance in the sensing electrode is increased, and thus detection sensitivity of the touch panel may be decreased.

In JP2015-108884A, the parasitic capacitance of the sensing electrode is not taken into consideration, and particularly, in a case where the electrode width of the lower electrode disposed on the display device side is increased to improve the detection sensitivity, the parasitic capacitance in the lower electrode may be increased, and the detection sensitivity for the touch operation may be decreased. Therefore, further improvement was required for detection with higher sensitivity.

In order to solve such a problem in the related art, the present inventor provided not only a plurality of electrode lines contributing to detection of the touch operation but also a plurality of non-connection lines arranged so as to be insulated from the plurality of electrode lines in the sensing electrode disposed on the display device side, and thus has succeeded in improving the detection sensitivity for the touch operation. Further, the present inventor set an occupancy rate of the plurality of electrode lines, which is calculated as a ratio of a total area of the plurality of electrode lines to a total area of the plurality of electrode lines and the plurality of non-connection lines, to a specific value, and thus has succeeded in further improving the detection sensitivity for the touch operation.

An object of the present invention is to provide a conductive member for a touch panel capable of improving detection sensitivity for a touch operation.

In addition, another object of the present invention is to provide a touch panel comprising such a conductive member for a touch panel.

A conductive member for a touch panel according to present invention comprises a first electrode layer and a second electrode layer which are disposed via a transparent insulating member, the first electrode layer being disposed closer to a touch surface side compared to the second electrode layer, in which the first electrode layer includes a plurality of first sensing electrodes which are arranged in parallel at an interval in a first direction and extend along a second direction orthogonal to the first direction, and a plurality of first electrode pads which are connected to the respective first sensing electrodes, each of the first sensing electrodes is constituted by a plurality of first electrode lines formed with fine metal wires, which are electrically connected to each of the first electrode pads, and has a first electrode width W1 in the first direction, the second electrode layer includes a plurality of second sensing electrodes which are arranged in parallel at an interval in the second direction and extend along the first direction, and a plurality of second electrode pads which are connected to the respective second sensing electrodes, each of the second sensing electrodes is constituted by a plurality of second electrode lines formed with fine metal wires, which are electrically connected to each of the second electrode pads, and a plurality of non-connection lines formed with fine metal wires, which are arranged so as to be insulated from the second electrode pad and the plurality of second electrode lines, and has a second electrode width W2 in the second direction, and the second electrode width W2 is larger than the first electrode width W1.

In a case where an occupancy rate of the plurality of second electrode lines, which is represented by a ratio of a total area of the plurality of second electrode lines to a total area of the plurality of second electrode lines and the plurality of non-connection lines in the second sensing electrode, is set to C2, $1.0 \leq (W2 \times C2)/W1 \leq 2.0$ is preferably satisfied.

In addition, $1.2 \leq (W2 \times C2)/W1 \leq 1.6$ is preferably further satisfied.

In addition, in each of the second sensing electrodes, the non-connection lines are preferably surrounded by the second electrode lines.

The first electrode layer may further include a plurality of first dummy electrodes which are arranged between the plurality of first sensing electrodes so as to be electrically insulated from the plurality of first sensing electrodes, and may be constituted by fine metal wires, and the second electrode layer may further include a plurality of second dummy electrodes which are arranged between the plurality of second sensing electrodes so as to be electrically insulated from the plurality of second sensing electrodes, and may be constituted by fine metal wires.

Furthermore, in a region where the first electrode layer and the second electrode layer are overlapped with each other, the fine metal wires constituting the plurality of first sensing electrodes, the fine metal wires constituting the plurality of first dummy electrodes, the fine metal wires constituting the plurality of second sensing electrodes, the fine metal wires constituting the plurality of non-connection lines, and the fine metal wires constituting the plurality of second dummy electrodes may be combined with each other to form a third mesh pattern constituted by a plurality of third mesh cells.

Furthermore, the first electrode layer may have a first mesh pattern which is constituted by a plurality of first mesh cells formed with the fine metal wires constituting the plurality of first sensing electrodes and the fine metal wires constituting the plurality of first dummy electrodes, and the second electrode layer may have a second mesh pattern which is constituted by a plurality of second mesh cells formed with the fine metal wires constituting the plurality of second sensing electrodes, the fine metal wires constituting the plurality of non-connection lines, and the fine metal wires constituting the plurality of second dummy electrodes.

Furthermore, the first mesh pattern may have a first mesh pitch, the second mesh pattern may have a second mesh pitch, and the third mesh pattern may have a third mesh pitch smaller than the first mesh pitch and the second mesh pitch.

In addition, each of the third mesh cells may have a shape of a quadrangle.

Furthermore, the quadrangle may be a rhombus.

In addition, the first mesh cell and the second mesh cell may be both rhombic and may have the same shape.

A touch panel according to the present invention comprises the above conductive member for a touch panel.

In addition, a touch panel according to the present invention, comprises a first electrode layer and a second electrode layer which are disposed via a transparent insulating member, and the first electrode layer being disposed closer to a touch surface side compared to the second electrode layer, in which the first electrode layer includes a plurality of first sensing electrodes which are arranged in parallel at an interval in a first direction and extend along a second direction orthogonal to the first direction, and a plurality of first electrode pads which are connected to the respective first sensing electrodes, each of the first sensing electrodes is constituted by a plurality of first electrode lines formed with fine metal wires, which are electrically connected to each of the first electrode pads, and has a first electrode width W1 in the first direction, the second electrode layer includes a plurality of second sensing electrodes which are arranged in parallel at an interval in the second direction and extend along the first direction, and a plurality of second electrode pads which are connected to the respective second sensing electrodes, each of the second sensing electrodes is constituted by a plurality of second electrode lines formed with fine metal wires, which are electrically connected to each of the second electrode pads, and a plurality of non-connection lines formed with fine metal wires, which are arranged so as to be insulated from the second electrode pad and the plurality of second electrode lines, and has a second electrode width W2 in the second direction, and the second electrode width W2 is larger than the first electrode width W1.

A conductive member according to the present invention comprises a first electrode layer and a second electrode layer which are disposed via a transparent insulating member, in which the first electrode layer includes a plurality of first sensing electrodes which are arranged in parallel at an interval in a first direction and extend along a second direction orthogonal to the first direction, and a plurality of first electrode pads which are connected to the respective first sensing electrodes, each of the first sensing electrodes is constituted by a plurality of first electrode lines formed with fine metal wires, which are electrically connected to each of the first electrode pads, and has a first electrode width W1 in the first direction, the second electrode layer includes a plurality of second sensing electrodes which are arranged in parallel at an interval in the second direction and extend along the first direction, and a plurality of second electrode pads which are connected to the respective second sensing electrodes, each of the second sensing electrodes is constituted by a plurality of second electrode lines formed with fine metal wires, which are electrically connected to each of the second electrode pads, and a plurality of non-connection lines formed with fine metal wires, which are arranged so as to be insulated from the second electrode pad and the plurality of second electrode lines, and has a second electrode width W2 in the second direction, and the second electrode width W2 is larger than the first electrode width W1.

According to the present invention, since the second sensing electrode has the non-connection line and the second electrode width W2 is larger than the first electrode width W1, it is possible to improve detection sensitivity for a touch operation.

DESCRIPTION OF THE PREFERRED EMBODIMENTS

Hereinafter, a conductive member for a touch panel and a touch panel according to an embodiment of the present invention will be described in detail based on preferred embodiments shown in the accompanying drawings.

Hereinafter, the expression "to" exhibiting a numerical value range includes numerical values indicated on both sides. For example, "s is a numerical value t1 to a numerical value t2" means that the range of s is a range including the numerical value t1 and the numerical value t2, and in a case of indicating by using mathematical symbols, t1≤s≤t2.

Unless otherwise described, an angle including "orthogonal", "parallel", and the like includes error ranges generally accepted in the art.

"Transparent" means that a light transmittance is at least 40% or more, preferably 75% or more, more preferably 80% or more, and even more preferably 90% or more with respect to the visible light wavelength range of 400 to 800 nm. The light transmittance is measured by using "Plastics—Determination of total luminous transmittance and reflectance" regulated in JIS K 7375:2008.

Figure 1:
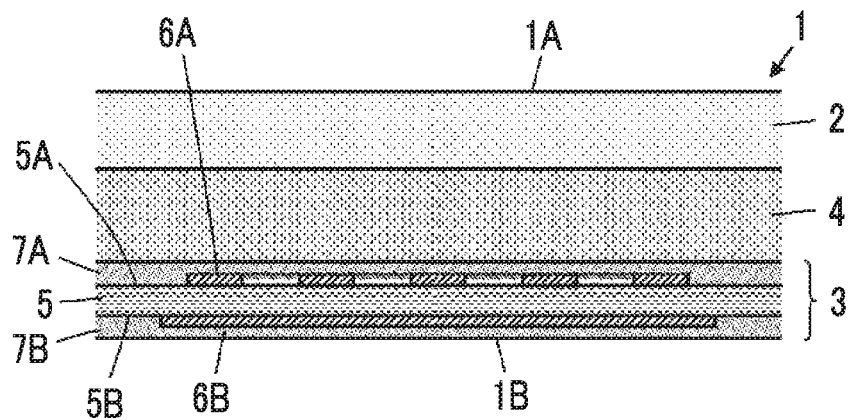
FIG. 1 is a partial cross-sectional view of a touch panel according to an embodiment of the present invention.

FIG. 1 shows a configuration of a touch panel 1 according to the embodiment of the present invention.

The touch panel 1 has a front surface 1A and a back surface 1B, and is used in a state where a display device (not shown) such as a liquid crystal display device is disposed on the back surface 1B side. The front surface 1A of the touch panel 1 is a touch surface for detecting a touch operation, and is a viewing side where an operator of the touch panel 1 observes an image displayed on the display device through the touch panel 1.

The touch panel 1 includes a transparent insulating cover panel 2 disposed on the front surface 1A side, and a conductive member 3 for a touch panel is bonded to a surface of the cover panel 2 opposite to the front surface 1A with a transparent adhesive layer 4. The cover panel 2 is provided with, for example, a black decorative layer (not shown).

The conductive member 3 for a touch panel includes a transparent insulating substrate 5 which is a transparent insulating member, and the transparent insulating substrate 5 has a first surface 5A facing a side of the front surface 1A of the touch panel 1 and a second surface 5B facing a side opposite to the first surface 5A. A first electrode layer 6A is formed on the first surface 5A of the transparent insulating substrate 5. A transparent protective layer 7A is formed so as to cover the first electrode layer 6A. In addition, a second electrode layer 6B is formed on the second surface 5B of the transparent insulating substrate 5. As shown in FIG. 1, a transparent protective layer 7A may be formed so as to cover the first electrode layer 6A, and a transparent protective layer 7B may be formed so as to cover the second electrode layer 6B. Moreover, the display device is disposed on the back surface 1B side of the touch panel 1. That is, the first electrode layer 6A is disposed closer to the touch surface side compared to the second electrode layer 6B, and the cover panel 2, the first electrode layer 6A, the second electrode layer 6B, and the display device are stacked in this order.

Figure 2:
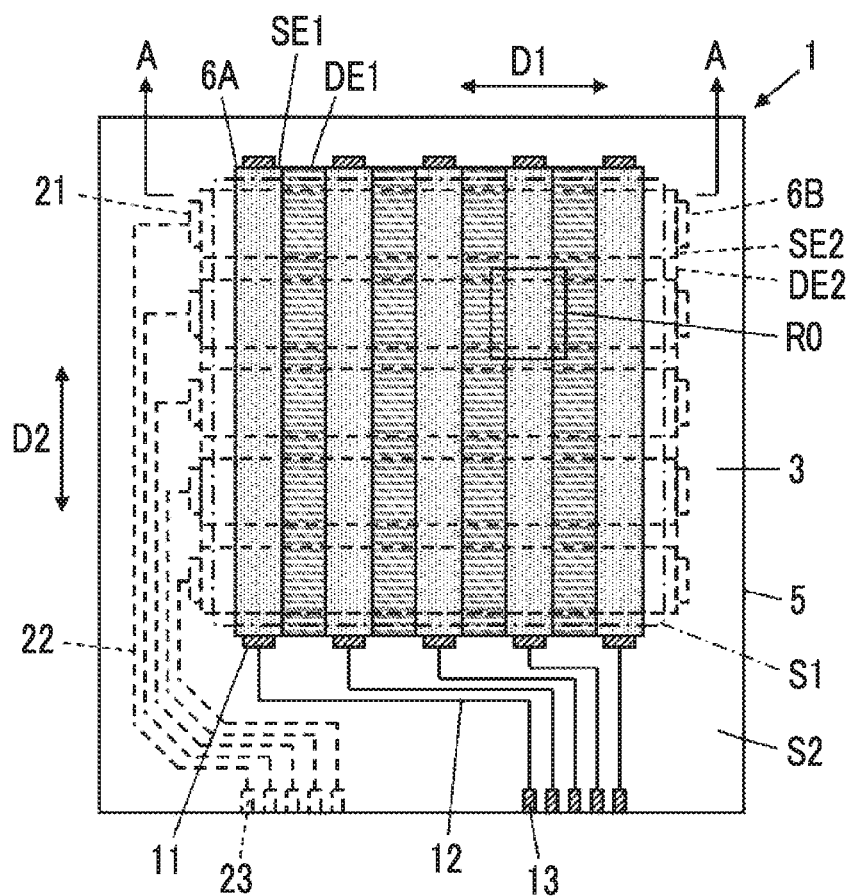
FIG. 2 is a plan view of a conductive member in the embodiment of the present invention.

FIG. 2 shows a plan view of the touch panel 1 viewed from the viewing side. FIG. 1 is a cross-sectional view taken along a line A-A in FIG. 2. In addition, in FIG. 2, the cover panel 2, the adhesive layer 4, the protective layer 7A, and the protective layer 7B are omitted for explanation. As shown in FIG. 2, in the conductive member 3 for a touch panel of the touch panel 1, an input region S1 for detecting a touch operation with a finger or a stylus pen is partitioned and an outer region S2 positioned outside the input region S1 is partitioned.

The first electrode layers 6A formed on the first surface 5A of the transparent insulating substrate 5 includes a plurality of first sensing electrodes SE1 which are arranged in parallel at an interval in a first direction D1 and extend along a second direction D2 orthogonal to the first direction D1, and a plurality of first dummy electrodes DE1 which are each disposed between the plurality of first sensing electrodes SE1 and insulated from the first sensing electrodes SE1. The first dummy electrodes DE1 are arranged in order to prevent a phenomenon in which gaps between the plurality of first sensing electrodes SE1 are conspicuous and a pattern of the first sensing electrode SE1 is visually recognized in a case where the touch panel 1 is viewed from the viewing side.

In addition, the first electrode layer 6A further includes a plurality of first electrode pads 11 which are connected to one ends of the respective first sensing electrodes SE1, a plurality of first edge part wires 12 which are connected to the respective first electrode pads 11, and a plurality of first external connection terminals 13 which are connected to the respective first edge part wires 12 and arranged and formed on an edge of the first surface 5A of the transparent insulating substrate 5.

Here, the first sensing electrode SE1 may comprise the same electrode pad as the first electrode pad 11 even at an end part where the first edge part wire 12 is not electrically connected via the first electrode pad 11. The electrode pad can also be used as a terminal for inspecting continuity of the first sensing electrode SE1.

The second electrode layer 6B formed on the second surface 5B of the transparent insulating substrate 5 includes a plurality of second sensing electrodes SE2 which are arranged in parallel at an interval in the second direction D2 and extend along the first direction D1, and a plurality of second dummy electrodes DE2 which are each disposed between the plurality of second sensing electrodes SE2 and insulated from the second sensing electrodes SE2. The second dummy electrodes DE2 are arranged in order to prevent a phenomenon in which gaps between the plurality of second sensing electrodes SE2 are conspicuous and a pattern of the second sensing electrode SE2 is visually recognized in a case where the touch panel 1 is viewed from the viewing side.

As shown in FIG. 2, in a case of being viewed from the viewing side, in the input region S1, the plurality of second sensing electrodes SE2 and the plurality of second dummy electrodes DE2 are arranged so as to be intersected and overlapped with the plurality of first sensing electrodes SE1 and the plurality of first dummy electrodes DE1.

In addition, the second electrode layer 6B further includes a plurality of second electrode pads 21 which are connected to one ends of the respective second sensing electrodes SE2, a plurality of second edge part wires 22 which are connected to the respective second electrode pads 21, and a plurality of second external connection terminals 23 which are connected to the respective second edge part wires 22 and arranged and formed on an edge of the second surface 5B of the transparent insulating substrate 5.

Here, the second sensing electrode SE2 may comprise the same electrode pad as the second electrode pad 21 even at an end part where the second edge part wire 22 is not electrically connected via the second electrode pad 21. The electrode pad can also be used as a terminal for inspecting continuity of the second sensing electrode SE2.

Figure 3:
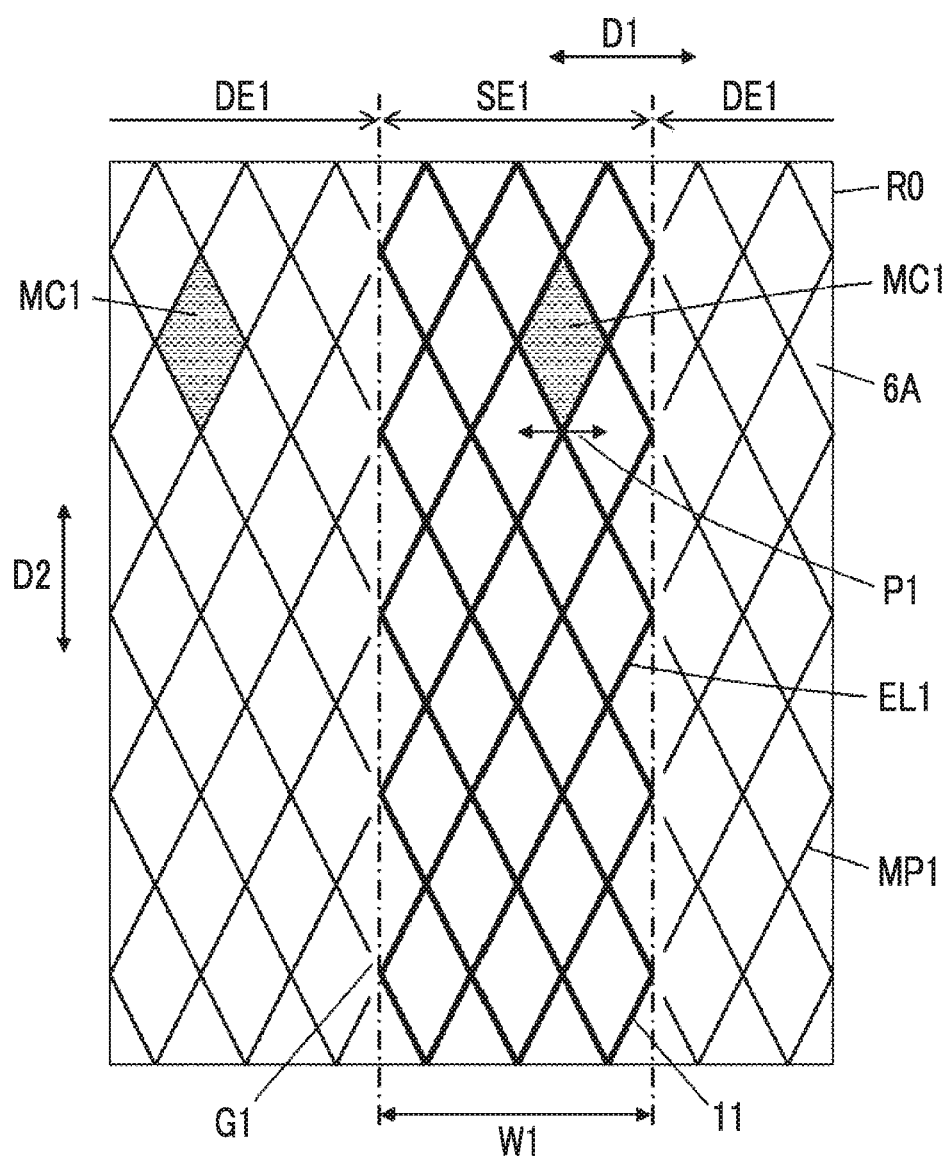
FIG. 3 is a partially enlarged plan view of a first electrode layer in the embodiment of the present invention.

FIG. 3 shows a partial plan view of only the first electrode layer 6A viewed from the viewing side in a region R0 including a portion where the first sensing electrode SE1 and the second sensing electrode SE2 are overlapped with each other. In FIG. 3, the protective layer 7A is omitted for the explanation.

As shown in FIG. 3, the first dummy electrode DE1 is formed adjacent to the first sensing electrode SE1. Moreover, for the explanation, in FIG. 3, the fine metal wires constituting the first sensing electrode SE1 are drawn by relatively thick solid lines and the fine metal wires constituting the first dummy electrode DE1 are drawn by relatively thin solid lines. In practice, line widths of the fine metal wires constituting the first sensing electrode SE1 and the fine metal wires constituting the first dummy electrode DE1 may be the same as each other.

As shown in FIG. 3, the first sensing electrode SE1 is a mesh-like electrode having a first mesh pattern MP1 which is constituted by a plurality of first mesh cells MC1 constituted by a plurality of first electrode lines EL1 formed with fine metal wires, and has a first electrode width W1.

The electrode width W1 of the first sensing electrode SE1 is a distance in the first direction D1 between outermost portions in the first direction D1 of the plurality of first electrode lines EL1 connected to one electrode pad 11 in one first sensing electrode SE1.

In addition, similarly to the first sensing electrode SE1, the first dummy electrode DE1 has a mesh shape having the first mesh pattern MP1 which is constituted by the plurality of first mesh cells MC1 constituted by fine metal wires, but the first dummy electrode DE1 is disposed with a gap G1 so as to be electrically insulated from the first sensing electrode SE1 and also disposed so as to be electrically insulated from the plurality of first electrode pads 11, the plurality of first edge part wires 12, and the plurality of first external connection terminals 13, and thus the first dummy electrode DE1 does not contribute to detection of a touch operation.

Here, in order that the plurality of first dummy electrodes DE1 are sufficiently electrically insulated from the plurality of first sensing electrodes SE1, lengths of the gaps G1 between the plurality of first dummy electrodes DE1 and the plurality of first sensing electrodes SE1 are preferably 5 μm to 50 μm, and from a viewpoint that the gap G1 is difficult to be visually recognized, are more preferably 5 μm to 20 μm. Moreover, in order to improve insulation properties, a disconnection portion having a length of 5 μm to 20 μm may be provided on each side of the first mesh cell MC1 constituting the first dummy electrode DE1.

Figure 4:
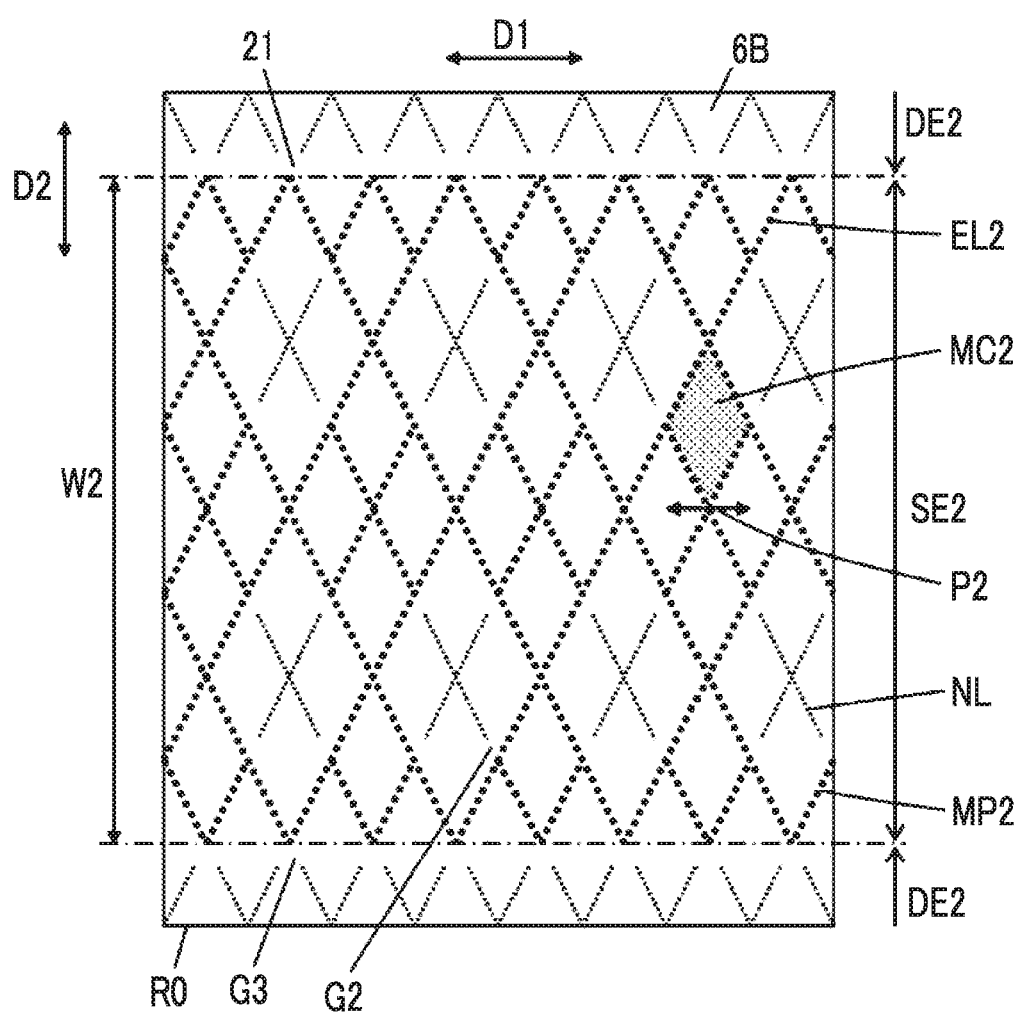
FIG. 4 is a partially enlarged plan view of a second electrode layer in the embodiment of the present invention.

FIG. 4 shows a partial plan view of only the second electrode layer 6B viewed from the viewing side in the region R0. In FIG. 4, the protective layer 7B is omitted for the explanation.

As shown in FIG. 4, the second dummy electrode DE2 is formed adjacent to the second sensing electrode SE2. The second dummy electrodes DE2 are arranged in order to prevent a phenomenon in which gaps between the plurality of second sensing electrodes SE2 are conspicuous and a pattern of the second sensing electrode SE2 is visually recognized in a case where the touch panel 1 is viewed from the viewing side. Moreover, for the explanation, the fine metal wires constituting the second dummy electrode DE2 are drawn by relatively thin dotted lines in FIG. 4, but in practice, are continuous fine metal wires.

As shown in FIG. 4, the second sensing electrode SE2 is a mesh-like electrode having a second mesh pattern MP2 which is constituted by a plurality of second mesh cells MC2 constituted by a plurality of second electrode lines EL2 formed with fine metal wires and a plurality of non-connection lines NL formed with second fine metal wires, and has a second electrode width W2. Here, for the explanation, the fine metal wires as the plurality of second electrode lines EL2 are drawn by relatively thick dotted lines in FIG. 4 and the fine metal wires as the plurality of non-connection lines NL are drawn by relatively thin dotted lines in FIG. 4, but in practice, all the fine metal wires are continuous fine metal wires. Moreover, in practice, line widths of the fine metal wires as the second electrode line EL2, the fine metal wires as the non-connection line, and the fine metal wires constituting the second dummy electrode DE2 may be the same as one another.

The electrode width W2 of the second sensing electrode SE2 is a distance in the second direction D2 between outermost portions in the second direction D2 of the plurality of second electrode lines EL2 connected to one electrode pad 21 in one second sensing electrode SE2.

The plurality of second electrode lines EL2 of the second sensing electrode SE2 are connected to the second electrode pad 21 and function as electrode lines for detecting a touch operation. Furthermore, the plurality of non-connection lines NL of the second sensing electrode SE2 are arranged with a gap G2 from the plurality of second electrode lines EL2 so as to be insulated from the plurality of second electrode lines EL2, and do not contribute to detection of a touch operation. In order that the plurality of second electrode lines EL2 are sufficiently electrically insulated from the plurality of non-connection lines NL, lengths of the gaps G2 between the plurality of second electrode lines EL2 and the non-connection lines NL are preferably 5 μm to 35 μm, and from a viewpoint that the gap G2 is difficult to be visually recognized, are more preferably 5 μm to 20 μm. Moreover, each of the non-connection lines NL is not disposed on an edge of the second sensing electrode SE2 but disposed inside the second sensing electrode SE2, and is disposed so as to be surrounded by the plurality of second electrode lines EL2.

In addition, although not shown, similarly to the second sensing electrode SE2, the second dummy electrode DE2 has a mesh shape having the second mesh pattern MP2 which is constituted by the plurality of second mesh cells MC2 constituted by fine metal wires. Since the second dummy electrode DE2 is disposed with a gap G3 so as to be electrically insulated from the second sensing electrode SE2 and also disposed so as to be electrically insulated from the plurality of second electrode pads 21, the plurality of second edge part wires 22, and the plurality of second external connection terminals 23, the second dummy electrode DE2 does not contribute to detection of a touch operation.

Here, in order that the plurality of second dummy electrodes DE2 are sufficiently electrically insulated from the plurality of second sensing electrodes SE2, lengths of the gaps G3 between the plurality of second dummy electrodes DE2 and the plurality of second sensing electrodes SE2 are preferably 5 μm to 50 μm, and from a viewpoint that the gap G3 is difficult to be visually recognized, are more preferably 5 µm to 20 µm. Moreover, in order to improve insulation properties, a disconnection portion having a length of 5 µm to 20 µm may be provided on each side of the second mesh cell MC2 constituting the second dummy electrode DE2.

Figure 5:
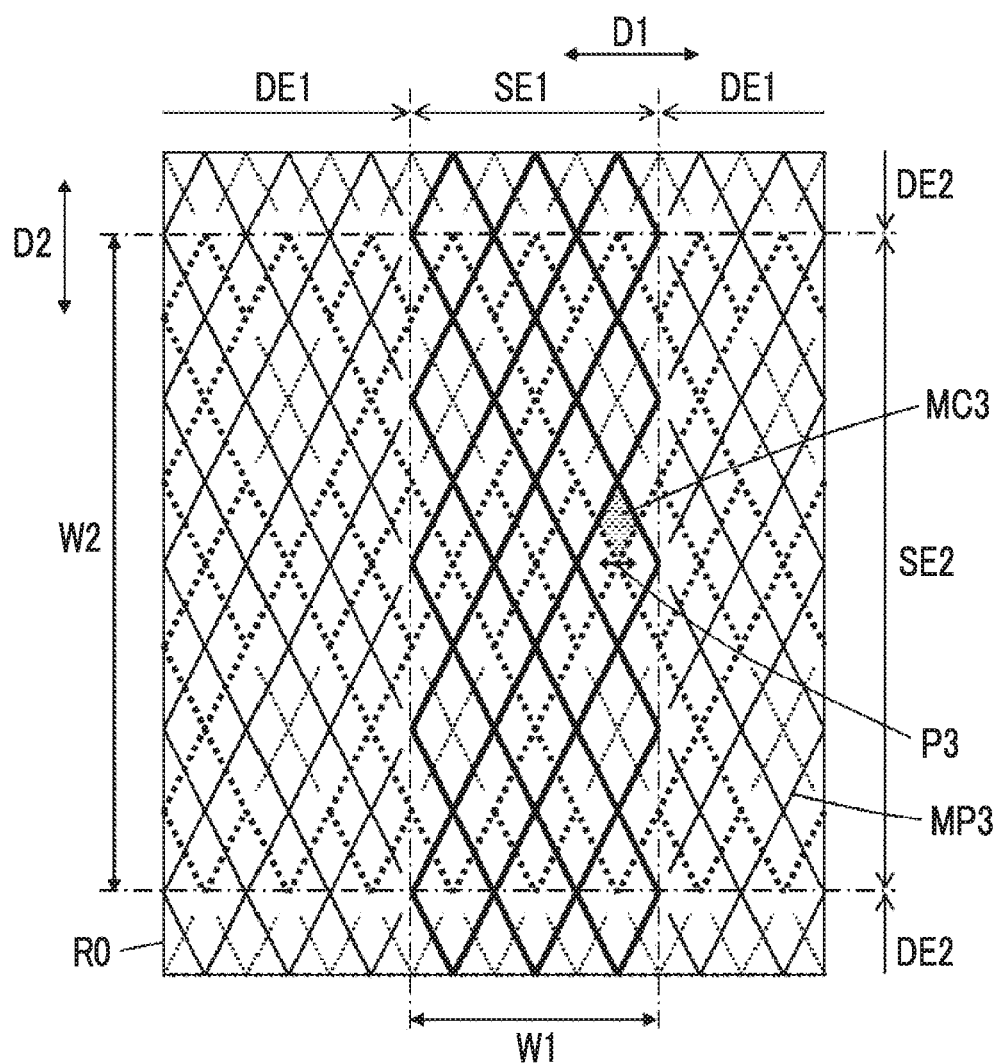
FIG. 5 is a partially enlarged plan view of the conductive member in the embodiment of the present invention.

FIG. 5 shows a partial plan view of the touch panel 1 viewed from the viewing side in the region R0. In the touch panel 1, as shown in FIG. 5, the first electrode layer 6A and the second electrode layer 6B are overlapped with each other. Thereby, the plurality of first sensing electrodes SE1 and the plurality of first dummy electrodes DE1 are combined with the plurality of second sensing electrodes SE2 and the plurality of second dummy electrodes DE2, that is, the first mesh pattern MP1 is combined with the second mesh pattern MP2 to form a third mesh pattern MP3 constituted by a plurality of third mesh cells MC3.

Here, in FIGS. 3 to 5, for the explanation, as a representative example, it is assumed that the first mesh cell MC1 and the second mesh cell MC2 have the same rhombic shape and the second mesh pattern MP2 is disposed at a position deviated from the first mesh pattern MP1 by ½ of a first mesh pitch P1. In this case, a third mesh pitch P3 of the third mesh pattern MP3 has a value of ½ of the first mesh pitch P1 of the first mesh pattern MP1 and the second mesh pitch P2 of the second mesh pattern MP2, and the third mesh cell MC3 has a rhombic shape. Furthermore, the first mesh pitch P can be determined by an average value of distances in the first direction D1 between centroids of the first mesh cells MC1 adjacent to each other in the first direction D1. Similarly, the second mesh pitch P2 and the third mesh pitch P3 can also be determined by an average value of the distances in the first direction D1 between the centroids of the respective mesh cells adjacent to each other in the first direction D1.

As described above, by overlapping the first electrode layer 6A and the second electrode layer 6B with each other to form the third mesh pattern MP3 with the plurality of third mesh cells MC3, it is possible to reduce a parasitic capacitance in an electrode intersection portion and prevent the fine metal wires included in the first electrode layer 6A and the fine metal wires included in the second electrode layer 6B from being conspicuously visually recognized. In particular, from a viewpoint of reducing moire caused by interference between a pixel of a display device (not shown) and a fine metal wire, a shape of the third mesh cell MC3 is preferably a quadrangle and particularly preferably a rhombus. An acute angle of the rhombus is preferably 20 degrees to 70 degrees. In a case where the third mesh cell MC3 is rhombic, a length of one side is preferably 100 µm or more and 300 µm or less.

Incidentally, in general, in a touch panel including a sensing electrode constituted by a fine metal wire, as an electrode width of a sensing electrode disposed at a position far from a viewing side, that is, a sensing electrode disposed on a display device side becomes larger than that of a sensing electrode disposed on the viewing side, an electromagnetic wave generated due to an operation of the display device is shielded, and thus noise is less likely to be generated in a detection signal for a touch operation. Therefore, detection accuracy in a case where the display device is operated to drive the touch panel is increased. On the other hand, in a case where the electrode width of the sensing electrode is increased, a parasitic capacitance in the sensing electrode is increased, and thus detection sensitivity of the touch panel may be decreased.

The present inventor has found that by providing the plurality of non-connection lines NL in the second sensing electrode SE2 disposed at a position far from a viewing side compared to the first sensing electrode SE1 and setting the second electrode width W2 of the second sensing electrode SE2 to be larger than the first electrode width W1 of the first sensing electrode SE1, noise in a detection signal for a touch operation is suppressed and an increase in the parasitic capacitance in the second sensing electrode SE2 is suppressed, and thus detection sensitivity for a touch operation can be improved. Furthermore, it has been found that by adjusting an occupancy rate C2 of the plurality of second electrode lines EL2 in the second sensing electrode SE2, detection sensitivity for a touch operation can be further improved.

Here, the occupancy rate C2 of the plurality of second electrode lines EL2 in the second sensing electrode SE2 is obtained by dividing a total area of the plurality of second electrode lines EL2 by a total area of the plurality of second electrode lines EL2 and the plurality of non-connection lines NL in the second sensing electrode SE2. Since the second sensing electrode SE2 has the non-connection lines NL, the occupancy rate C2 takes a value which is more than 0 and less than 1. Moreover, the total area of the plurality of second electrode lines EL2 and the plurality of non-connection lines NL in the second sensing electrode SE2 refers to a total value of an area occupied by the plurality of second electrode lines EL2 and an area occupied by the plurality of non-connection lines NL in one second sensing electrode SE2 in a case where the touch panel 1 is viewed from the viewing side. Furthermore, the total area of the plurality of second electrode lines EL2 in the second sensing electrode SE2 refers to a total value of an area occupied by the plurality of second electrode lines EL2 in one second sensing electrode SE2 in a case where the touch panel 1 is viewed from the viewing side.

In a case where the occupancy rate C2 of the plurality of second electrode lines EL2 of the second sensing electrode SE2 is set to C2, and an effective electrode width ratio WR satisfies the following Expression (1), in the touch panel 1, detection sensitivity for a touch operation can be further improved. That is, by setting the effective electrode width ratio WR represented by (W2×C2)/W1, which is a value obtained by multiplying the second electrode width W2 of the second sensing electrode SE2 by the occupancy rate C2 of the plurality of second electrode lines and dividing the resultant by the first electrode width W1 of the first sensing electrode SE1, to be 1.0 or more and 2.0 or less, detection sensitivity for a touch operation can be improved.

$$1.0 \leq (W2 \times C2)/W1 \leq 2.0 \tag{1}$$

In addition, in a case where the effective electrode width ratio WR satisfies the following Expression (2), in the touch panel 1, detection sensitivity for a touch operation can be further improved.

$$1.2 \leq (W2 \times C2)/W1 \leq 1.6 \tag{2}$$

The result of evaluating the detection sensitivity of the touch panel 1 by variously changing the occupancy rate C2 will be described later in detail.

Furthermore, in the embodiment of the present invention, the first mesh pattern MP1 formed in the first sensing electrode SE1 and the first dummy electrode DE1 and the second mesh pattern MP2 formed in the second sensing electrode SE2 and the second dummy electrode DE2 are constituted by repeated patterns of the first mesh cell MC1 and the second mesh cell MC2 having the same rhombic shape, but the present invention is not limited to the embodiment. That is, the first mesh cell MC1 included in the first sensing electrode SE1 and the first dummy electrode DE1 and the second mesh cell MC2 included in the second sensing electrode SE2 and the second dummy electrode DE2 can be formed as a regular hexagon, a regular triangle, a quadrangle such as a parallelogram, other polygonal shapes, and a combination thereof, other than the rhombus. Moreover, each side of the mesh cell may not have a straight-line shape, and may have a wavy line shape. However, regarding these mesh cells, from a viewpoint of reducing moire with a display device (not shown), the first mesh cell MC1 and the second mesh cell MC2 are preferably rhombic and an acute angle of the rhombus is preferably 20 degrees to 70 degrees.

In addition, the third mesh pattern MP3 formed by overlapping the first electrode layer 6A and the second electrode layer 6B with each other is constituted by the plurality of rhombic third mesh cells MC3 having a fixed type of regular pattern, but is not limited thereto, and may be constituted by a mesh in which the third mesh cell MC3 has an irregular shape. In this case, it is possible to make the plurality of third mesh cells MC3 as a mesh cell of a polygonal shape, particularly, a quadrangular shape or a parallelogram shape having a length of an irregular side of −10% to +10% with respect to an average value of lengths of sides of the respective mesh cells. With such a configuration, it is possible to suppress moire with a pixel pattern of a display device (not shown) in the touch panel 1 and reduce color noise.

In addition, in a case where the third mesh pattern MP3 is constituted by the third mesh cell MC3 having an irregular shape, and an average value of lengths of sides of the plurality of third mesh cells MC3 and a mesh pitch thereof are calculated, the average value of the lengths of sides and the mesh pitch with respect to the mesh cells arranged in a region having a predetermined area can be calculated. For example, it is possible to calculate the average value of the lengths of sides and the mesh pitch with respect to the plurality of mesh cells arranged in a 10 mm×10 mm region.

Furthermore, the plurality of first mesh cells MC1 included in the plurality of first sensing electrodes SE1 and the plurality of first dummy electrodes DE1, the plurality of second mesh cells MC2 included in the plurality of second sensing electrodes SE2 and the plurality of second dummy electrodes DE2, and the plurality of third mesh cells MC3 included in the third mesh pattern MP3 formed by overlapping the first electrode layer 6A and the second electrode layer 6B with each other can each have a random shape.

In addition, in the embodiment of the present invention, the first electrode layer 6A is formed on the first surface 5A of the transparent insulating substrate 5 and the second electrode layer 6B is formed on the second surface 5B of the transparent insulating substrate 5. However, as long as the first electrode layer 6A and the second electrode layer 6B are disposed and insulated from each other via a transparent insulating member, the present invention is not limited to the embodiment.

Figure 6:
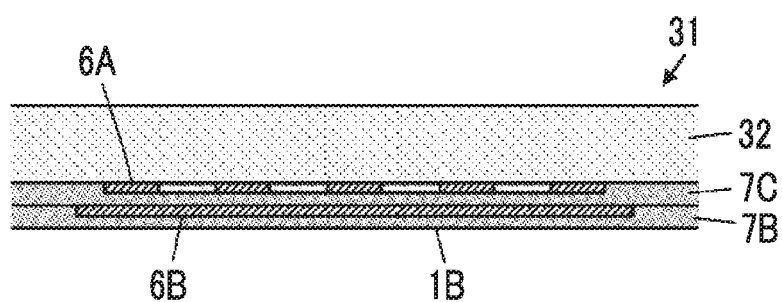
FIG. 6 is a partial cross-sectional view of a touch panel according to a modification example of the embodiment of the present invention.

FIG. 6 shows a partial cross-sectional view of a conductive member 31 for a touch panel according to a modification example of the embodiment of the present invention. In the modification example shown in FIG. 6, the first electrode layer 6A is formed on a transparent insulating substrate 32, and a transparent insulating layer 7C is formed so as to cover the first electrode layer 6A. Moreover, the second electrode layer 6B is formed on the transparent insulating layer 7C, and the protective layer 7B is formed so as to cover the second electrode layer 6B. In this case, the transparent insulating layer 7C covering the first electrode layer 6A serves as a "transparent insulating member" interposed between the first electrode layer 6A and the second electrode layer 6B, and the first electrode layer 6A and the second electrode layer 6B are disposed and insulated from each other via the transparent insulating member.

Furthermore, in a case where the conductive member 31 for a touch panel according to the modification example of the embodiment of the present invention is used as a touch panel, the transparent insulating substrate 32 can be used as a cover panel. In a case where the transparent insulating substrate 32 is used as a cover panel, a decorative layer may be formed on the transparent insulating substrate 32.

Figure 7:
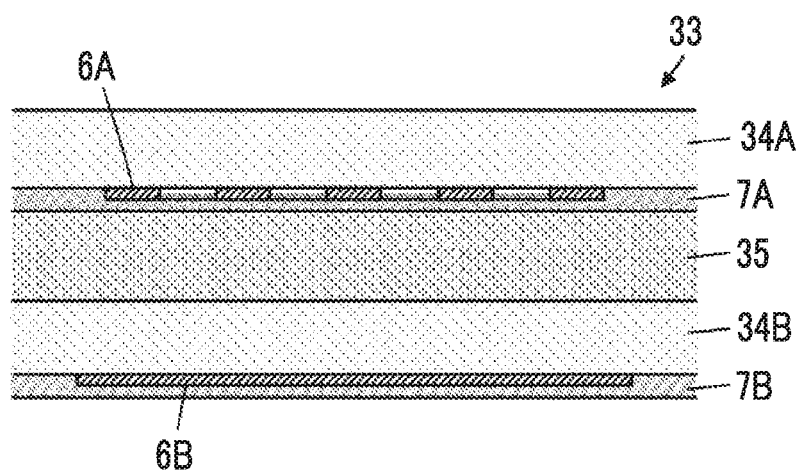
FIG. 7 is a partial cross-sectional view of a touch panel according to another modification example of the embodiment of the present invention.

In addition, FIG. 7 shows a partial cross-sectional view of a conductive member 33 for a touch panel according to another modification example of the embodiment of the present invention. In the modification example shown in FIG. 7, the first electrode layer 6A is formed on a first transparent insulating substrate 34A, and the protective layer 7A is formed so as to cover the first electrode layer 6A. Moreover, the second electrode layer 6B is formed on a second transparent insulating substrate 34B, and the protective layer 7B is formed so as to cover the second electrode layer 6B. Furthermore, the protective layer 7A formed on the first transparent insulating substrate 34A and the second transparent insulating substrate 34B adhere to each other via a transparent adhesive layer 35. In this case, the protective layer 7A covering the first electrode layer 6A, the adhesive layer 35, and the second transparent insulating substrate 34B serve as a "transparent insulating member" interposed between the first electrode layer 6A and the second electrode layer 6B, and the first electrode layer 6A and the second electrode layer 6B are disposed and insulated from each other via the transparent insulating member.

In addition, a non-connection line can also be provided for the first sensing electrode SE1, but in this case, the first electrode line EL1 which is electrically connected to the first electrode pad 11 is replaced with the non-connection line which is not connected to the first electrode pad 11. Therefore, from a viewpoint of reducing a resistance value of the first sensing electrode SE1, the non-connection line is not preferably provided for the first sensing electrode SE1.

Hereinafter, each member constituting the touch panel 1 will be described.

<Substrate>

The transparent insulating substrates 5, 32, 34A, and 34B are not particularly limited as long as the transparent insulating substrates are transparent, have electric insulation properties, and can support the first electrode layer 6A and the second electrode layer 6B. As the material constituting the transparent insulating substrate 5, for example, glass, tempered glass, alkali free glass, polyethylene terephthalate (PET), polyethylene naphthalate (PEN), a cyclo-olefin polymer (COP), a cyclic olefin copolymer (COC), polycarbonate (PC), an acrylic resin, polyethylene (PE), polypropylene (PP), polystyrene (PS), polyvinyl chloride (PVC), polyvinylidene chloride (PVDC), cellulose triacetate (TAC), or the like can be used. A thickness of each of the transparent insulating substrates 5, 32, 34A, and 34B is, for example, 20 to 1000 μm. In particular, in a case of a rigid transparent insulating substrate formed of glass or tempered glass, the thickness is 100 μm to 800 μm, and in a case of a flexible transparent insulating substrate formed of PET or COP, the thickness is 30 to 100 μm. A light transmittance of each of the transparent insulating substrates 5, 32, 34A, and 34B is preferably 40% to 100%. The light transmittance is measured, for example, by using "Plastics—Determination of total luminous transmittance and reflectance" regulated in JIS K 7375:2008.

<Fine Metal Wire>

The fine metal wires forming the first sensing electrode SE1 and the first dummy electrode DE1 and the fine metal wires forming the second sensing electrode SE2 and the second dummy electrode DE2 are fine metal wires having a line width of 0.5 μm to 10 μm. The line widths of these fine metal wires are more preferably 1.0 μm to 5.0 μm. A material for the fine metal wire is preferably silver, copper, aluminum, gold, molybdenum, chromium, or the like, and can be used in alloys, oxides, or laminates thereof. In particular, silver or copper is preferable from a viewpoint of a resistance value, and for example, a fine metal wire having a laminated structure of molybdenum/aluminum/molybdenum, molybdenum/copper/molybdenum, copper oxide/copper/copper oxide, or the like can be used.

A film thickness of the fine metal wire is 0.05 μm to 10 μm and is preferably 0.1 μm to 1 μm. In order to improve a visibility of the fine metal wire, a blackening layer may be provided on the fine metal wire or between the fine metal wire, the transparent insulating substrate, and the fine metal wire. As the blackening layer, copper oxide, molybdenum oxide, or the like can be used.

<Protective Layer>

As the transparent protective layers 7A and 7B covering the fine metal wire, an organic film of gelatin, an acrylic resin, a urethane resin, or the like, and an inorganic film of silicon dioxide or the like can be used, and the film thickness thereof is preferably 0.01 μm or more and 10 μm or less.

In addition, as necessary, a transparent coating layer may be formed on the protective layer. As the transparent coating layer, an organic film of an acrylic resin, a urethane resin, or the like is used, and the film thickness thereof is preferably 1 μm or more and 100 μm or less.

<Transparent Insulating Layer>

As the transparent insulating layer 7C formed between the first electrode layer 6A and the second electrode layer 6B, an organic film of an acrylic resin, a urethane resin, or the like, and an inorganic film of silicon dioxide, silicon nitride, or the like can be used, and the film thickness thereof is preferably 0.1 μm or more and 10 μm or less.

In addition, as necessary, the following layers can be additionally provided in the touch panel 1.

<Edge Part Wire Insulating Film>

For the purpose of preventing a short circuit between the edge part wires and corrosion of the edge part wire, an edge part wire insulating film may be formed on the first edge part wire 12 and the second edge part wire 22 as shown in FIG. 2. As the edge part wire insulating film, an organic film of an acrylic resin, a urethane resin, or the like is used, and the film thickness thereof is preferably 1 μm or more and 30 μm or less. The edge part wire insulating film may be formed only on any one of the first edge part wire 12 and the second edge part wire 22.

<Undercoat>

In order to enhance adhesiveness, an undercoat may be provided between the transparent insulating substrates 5, 32, 34A, and 34B and the first electrode layer 6A or between the transparent insulating substrates 5, 32, 34A, and 34B and the second electrode layer 6B. As the undercoat, an organic film of gelatin, an acrylic resin, a urethane resin, a polyester resin, or the like, and an inorganic film of silicon dioxide or the like can be used, and the film thickness thereof is preferably 0.01 μm or more and 10 μm or less.

<Planarization Layer>

In order to planarize front surfaces of the transparent insulating substrates 5, 32, 34A, and 34B, a planarization layer may be provided between the transparent insulating substrates 5, 32, 34A, and 34B and the first electrode layer 6A or between the transparent insulating substrates 5, 32, 34A, and 34B and the second electrode layer 6B. As the planarization layer, an organic film of an acrylic resin, a urethane resin, a polyester resin, or the like can be used, and the film thickness thereof is preferably 0.01 μm or more and 10 μm or less. In particular, in a case where a decorative layer is provided on the transparent insulating substrates 5, 32, 34A, and 34B, a planarization layer is preferably provided.

EXAMPLES

Hereinafter, the present invention will be described in more detail based on the examples. The materials, amounts used, proportions, treatment details, treatment procedures, or the like described in the following examples can be appropriately changed without departing from the gist of the present invention, and the scope of the present invention is not restrictively construed by the following examples.

<Manufacturing of Touch Panel>

Various photo masks with different exposure patterns were prepared, and a plurality of first sensing electrodes, a plurality of first dummy electrodes, a plurality of second sensing electrodes, and a plurality of second dummy electrodes, which were constituted by fine metal wires, were respectively formed on both surfaces of the transparent insulating substrate, so as to manufacture a conductive member. Furthermore, as the substrate of the conductive member, a polyethylene terephthalate film having a thickness of 38 μm was used, and a fine metal wire was formed of a silver wire. Moreover, in the plurality of first sensing electrodes, the plurality of first dummy electrodes, the plurality of second sensing electrodes, and the plurality of second dummy electrodes, the line width of the mesh, that is, the line width of each of the fine metal wires, was set to 4.0 μm, and a rhombic mesh shape with an acute angle of 60 degrees was adopted as the mesh shape.

In addition, the manufactured conductive member was bonded to a cover panel made of tempered glass having a thickness of 1.1 mm, by using an optical transparent pressures sensitive adhesive sheet having a thickness of 75 μm and made of 8146-4 (product number) manufactured by 3M Company, so as to manufacture a touch panel. Moreover, in order to drive the manufactured touch panel, an integrated circuit manufactured by Atmel Corporation was connected to the touch panel.

<Evaluation of Detection Sensitivity>

The manufactured touch panel is disposed on a liquid crystal display (LCD), and the detection sensitivity of the touch panel was evaluated while displaying white on the entire surface of the LCD. Each touch position was detected while a stylus pen having a tip diameter of 2.0 mm was caused to be brought into contact with positions of preset 10,000 places on the front surface of the touch panel in order by using a probe robot. Then, the detection results at the 10,000 places were compared to corresponding set values. Specifically, sensitivity was evaluated based on the following evaluation standards using a $9973^{rd}$ value counted from the smallest distance between the detection position and the preset position.

"A": the above-mentioned $9973^{rd}$ value is less than 1.0 mm

"B": The above-mentioned $9973^{rd}$ value is 1.0 mm or more and less than 2.0 mm "C": The above-mentioned $9973^{rd}$ value is 2.0 mm or more and less than 3.0 mm "D": The above-mentioned $9973^{rd}$ value is 3.0 mm or more In addition, the evaluation "D" is a level with a problem in practical use in which erroneous detection frequently occurs, the evaluation "C" is a level without a problem in practical use in which erroneous detection occasionally occurs, the evaluation "B" is an excellent level in which erroneous detection rarely occurs, and the evaluation "A" is a very excellent level in which erroneous detection does not occur.

Here, a method of manufacturing the conductive member 3 according to the embodiment of the present invention will be specifically described.

(Preparation of Silver Halide Emulsion)

The following solutions 2 and 3 were added by an amount corresponding to each 90% thereof to the following solution 1 kept at a temperature of 38° C. and potential of hydrogen (pH) of 4.5 with stirring over 20 minutes, so as to form nuclear particles of 0.16 μm. Subsequently, the following solutions 4 and 5 were added over 8 minutes, and the following solutions 2 and 3 were added by a remaining amount of each 10% thereof over 2 minutes, so as to grow the particles to 0.21 μm. Furthermore, 0.15 g of potassium iodide was added, and the resultant was aged for 5 minutes so as to complete particle formation.

| Solution 1: | |
|---|---|
| Water | 750 ml |
| Gelatin | 9 g |
| Sodium chloride | 3 g |
| 1,3-Dimethylimidazolidine-2-thione | 20 mg |
| Sodium benzenethiosulfonate | 10 mg |
| Citric acid | 0.7 g |
| Solution 2: | |
| Water | 300 ml |
| Silver nitrate | 150 g |
| Solution 3: | |
| Water | 300 ml |
| Sodium chloride | 38 g |
| Potassium bromide | 32 g |
| Potassium hexachloroiridate(III) (0.005% KCl 20% aqueous solution) | 8 ml |
| Ammonium hexachlororhodate (0.001% NaCl 20% aqueous solution) | 10 ml |
| Solution 4: | |
| Water | 100 ml |
| Silver nitrate | 50 g |
| Solution 5: | |
| Water | 100 ml |
| Sodium chloride | 13 g |
| Potassium bromide | 11 g |
| Yellow prussiate of potash | 5 mg |

Thereafter, washing with water was performed by a flocculation method according to a general method. Specifically, the temperature was decreased to 35° C., 3 liters of distilled water was added, and sulfuric acid was used to lower the pH until the silver halide was precipitated (in the range of pH 3.6±0.2). Next, about 3 liters of supernatant was removed (first washing with water). Additional 3 liters of distilled water was added, and sulfuric acid was added until the silver halide was precipitated. Again, 3 liters of supernatant was removed (second washing with water). The same operation as the second washing with water was further repeated one more time (third washing with water) to complete a water washing-desalting step. An emulsion after washing with water and desalting was adjusted to have pH of 6.4 and pAg of 7.5, 3.9 g of gelatin, 10 mg of sodium benzenethiosulfonate, 3 mg of sodium benzenethiosulfinate, 15 mg of sodium thiosulfate, and 10 mg of chloroauric acid were added, chemical sensitization was performed so as to obtain the optimum sensitivity at 55° C., and 100 mg of 1,3,3a,7-tetraazaindene as a stabilizer and 100 mg of PROXEL (trade name, manufactured by ICI Co., Ltd.) as a preservative were added. The finally obtained emulsion was a silver iodochlorobromide cubic grain emulsion including 0.08 mol % of silver iodide, having a proportion of silver chlorobromide of 70 mol % of silver chloride and 30 mol % of silver bromide, and having an average particle diameter of 0.22 μm and a coefficient of variation of 9%.

(Preparation of Composition for Forming Photosensitive Layer)

$1.2 \times 10^4$ mol/mol Ag of 1,3,3a,7-tetraazaindene, $1.2 \times 10^{-2}$ mol/mol Ag of hydroquinone, $3.0 \times 10^{-4}$ mol/mol Ag of citric acid, 0.90 g/mol Ag of 2,4-dichloro-6-hydroxy-1,3,5-triazine sodium salt, and a slight amount of a hardener were added to the above emulsion, and pH of the coating solution was adjusted to 5.6 by using citric acid.

A polymer latex containing a polymer represented by (P-1) and a dispersing agent having dialkylphenyl PEO sulfate ester (a mass ratio of dispersing agent/polymer is 2.0/100=0.02) was added to the above coating solution such that polymer/gelatin (mass ratio)=0.5/1 is satisfied with respect the containing gelatin.

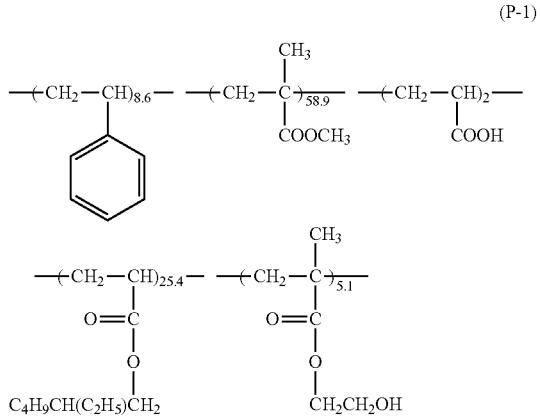

(P-1)

Furthermore, EPOXY RESIN DY 022 (trade name: manufactured by Nagase ChemteX Corporation) was added as a crosslinking agent. The addition amount of the crosslinking agent was adjusted such that the amount of the crosslinking agent in the photosensitive layer described below is 0.09 g/m².

The composition for forming a photosensitive layer was prepared as described above.

In addition, the polymer represented by (P-1) described above was synthesized with reference to JP3305459B and JP3754745B.

(Photosensitive Layer Formation Step)

Both surfaces of the transparent insulating substrate were coated with the above polymer latex, so as to provide an undercoat layer having a thickness of 0.05 μm. As the transparent insulating substrate, polyethylene terephthalate film of 38 μm (manufactured by FUJIFILM Corporation) was used.

Next, an antihalation layer formed of a mixture of the above polymer latex, gelatin, and a dye having an optical density of about 1.0 and being decolorized by alkali of a developer was provided on the undercoat layer. Moreover, the mixing mass ratio (polymer/gelatin) of the polymer and the gelatin was 2/1, and the content of the polymer was 0.65 g/m².

The above antihalation layer was coated with the above composition for forming a photosensitive layer and was further coated with a composition obtained by mixing the polymer latex, gelatin, EPOCROS K-2020E (trade name: manufactured by NIPPON SHOKUBAI CO., LTD., oxazoline-based crosslinking reactive polymer latex (crosslinkable group: oxazoline group)), and SNOWTEX C (registered trademark, trade name: manufactured by Nissan Chemical Corporation, colloidal silica) at a solid content mass ratio (polymer/gelatin/EPOCROS K-2020E/SNOWTEX C (registered trademark)) of 1/1/0.3/2 such that the amount of gelatin is 0.08 g/m², so as to obtain a support on both surfaces of which photosensitive layers were formed. A support on both surfaces of which photosensitive layers were formed was referred to as a film A. The formed photosensitive layer had a silver content of 6.2 g/m² and a gelatin content of 1.0 g/m².

(Exposure and Development Step)

For example, a first photo mask for forming a first sensing electrode having a pattern as shown in FIG. 3 and a second photo mask for forming a second sensing electrode having a pattern as shown in FIG. 4 were respectively prepared, the first photo mask and the second photo mask were disposed on both surfaces of the above film A, and the both surfaces were simultaneously exposed with parallel light by using a high pressure mercury lamp as a light source.

After the exposure, development treatment was performed by using the following developer, and development treatment was further performed by using a fixing solution (trade name: N3X-R for CN16X, manufactured by FUJIFILM Corporation). Rinsing with pure water was performed, and the water was dried, so as to obtain a support on both surfaces of which fine metal wires made of Ag (silver) and gelatin layers were formed. The gelatin layer was formed between the fine metal wires. The obtained film was referred to as a film B.

(Composition of Developer)

The following compounds were contained in 1 liter (L) of a developer.

| | |
|---|---|
| Hydroquinone | 0.037 mol/L |
| N-Methylaminophenol | 0.016 mol/L |
| Sodium metaborate | 0.140 mol/L |
| Sodium hydroxide | 0.360 mol/L |
| Sodium bromide | 0.031 mol/L |
| Potassium metabisulfite | 0.187 mol/L |

(Gelatin Degradation Treatment)

The film B was immersed in an aqueous solution (concentration of proteolytic enzyme: 0.5 mass %, solution temperature: 40° C.) of a proteolytic enzyme (BIOPRASE AL-15FG manufactured by Nagase ChemteX Corporation) for 120 seconds. The film B was extracted from the aqueous solution, immersed in warm water (solution temperature: 50° C.) for 120 seconds, and washed. The film after gelatin degradation treatment was referred to as a film C.

<Resistance Reduction Treatment>

A calender treatment was performed on the above film C by using a calender device including metal rollers at a pressure of 30 kN. At this time, two polyethylene terephthalate films having a rough surface shape with line asperity Ra of 0.2 μm and Sm of 1.9 μm (measured with a shape analysis laser microscope VK-X110 manufactured by KEYENCE CORPORATION (JIS-B-0601-1994)) were transported such that the rough surfaces face the front and back surfaces of the above film C, and the rough surface shapes were transferred and formed on the front and back surfaces of the above film C.

After the above calender treatment, this film was passed through an overheated steam tank at a temperature of 150° C. for 120 seconds to perform heat treatment. The film after the heat treatment was referred to as a film D. This film D is a conductive member.

Next, Examples 1 to 7 and Comparative Examples 1 and 2 will be described. Examples 1 to 7 are touch panels having the same configuration as the touch panel according to the embodiment of the present invention shown in FIGS. 1 to 5, and are different from one another in values such as the second electrode width W2 of the second sensing electrode SE2 and the occupancy rate C2 of the plurality of second electrode lines EL2 in the second sensing electrode SE2.

Example 1

Example 1 is a touch panel having the same configuration as the touch panel according to the embodiment of the present invention shown in FIGS. 1 to 5, the first electrode width W1 of the first sensing electrode SE1 was set to 2.0 mm, the second electrode width W2 of the second sensing electrode SE2 was set to 4.0 mm, and the occupancy rate C2 of the plurality of second electrode lines EL2 in the second sensing electrode SE2 was set to 0.75. At this time, a value of the product of the second electrode width W2 and the occupancy rate C2 was 3.0 and a value of the effective electrode width ratio WR obtained by dividing the product of the second electrode width W2 and the occupancy rate C2 by the first electrode width W1 was 1.5.

Example 2

Example 2 is the same as Example 1 except that the occupancy rate C2 of the plurality of second electrode lines EL2 in the second sensing electrode SE2 was set to 0.50. At this time, a value of the product of the second electrode width W2 and the occupancy rate C2 was 2.0 and a value of the effective electrode width ratio WR obtained by dividing the product of the second electrode width W2 and the occupancy rate C2 by the first electrode width W1 was 1.0.

Example 3

Example 3 is the same as Example 1 except that the occupancy rate C2 of the plurality of second electrode lines EL2 in the second sensing electrode SE2 was set to 0.60. At this time, a value of the product of the second electrode width W2 and the occupancy rate C2 was 2.4 and a value of the effective electrode width ratio WR obtained by dividing the product of the second electrode width W2 and the occupancy rate C2 by the first electrode width W1 was 1.2.

Example 4

Example 4 is the same as Example 1 except that the occupancy rate C2 of the plurality of second electrode lines EL2 in the second sensing electrode SE2 was set to 0.80. At this time, a value of the product of the second electrode width W2 and the occupancy rate C2 was 3.2 and a value of the effective electrode width ratio WR obtained by dividing the product of the second electrode width W2 and the occupancy rate C2 by the first electrode width W1 was 1.6.

Example 5

Example 5 is the same as Example 1 except that the second electrode width W2 of the second sensing electrode SE2 was set to 5.0 mm and the occupancy rate C2 of the plurality of second electrode lines EL2 in the second sensing electrode SE2 was set to 0.80. At this time, a value of the product of the second electrode width W2 and the occupancy rate C2 was 4.0 and a value of the effective electrode width ratio WR obtained by dividing the product of the second electrode width W2 and the occupancy rate C2 by the first electrode width W1 was 2.0.

Example 6

Example 6 is the same as Example 1 except that the occupancy rate C2 of the plurality of second electrode lines EL2 in the second sensing electrode SE2 was set to 0.4. At this time, a value of the product of the second electrode width W2 and the occupancy rate C2 was 1.6 and a value of the effective electrode width ratio WR obtained by dividing the product of the second electrode width W2 and the occupancy rate C2 by the first electrode width W1 was 0.80.

Example 7

Example 7 is the same as Example 1 except that the second electrode width W2 of the second sensing electrode SE2 was set to 5.0 mm and the occupancy rate C2 of the plurality of second electrode lines EL2 in the second sensing electrode SE2 was set to 0.90. At this time, a value of the product of the second electrode width W2 and the occupancy rate C2 was 4.5 and a value of the effective electrode width ratio WR obtained by dividing the product of the second electrode width W2 and the occupancy rate C2 by the first electrode width W1 was 2.3 with two significant figures.

Comparative Example 1

Comparative Example 1 is the same as Example 1 except that the non-connection line NL was not provided in the second sensing electrode SE2 and the occupancy rate C2 of the plurality of second electrode lines EL2 in the second sensing electrode SE2 was set to 1.0. At this time, a value of the product of the second electrode width W2 and the occupancy rate C2 was 4.0 and a value of the effective electrode width ratio WR obtained by dividing the product of the second electrode width W2 and the occupancy rate C2 by the first electrode width W1 was 2.0.

Comparative Example 2

Comparative Example 2 is the same as Example 1 except that the first electrode width W1 of the first sensing electrode SE1 was set to 4.0 mm, the second electrode width W2 of the second sensing electrode SE2 was set to 2.0 mm, and the occupancy rate C2 of the plurality of second electrode lines EL2 in the second sensing electrode SE2 was set to 0.50. At this time, a value of the product of the second electrode width W2 and the occupancy rate C2 was 1.0 and a value of the effective electrode width ratio WR obtained by dividing the product of the second electrode width W2 and the occupancy rate C2 by the first electrode width W1 was 0.25.

The evaluation results of Examples 1 to 7 and Comparative Examples 1 and 2 are presented in the following table.

TABLE 1

| | First electrode width W1 (mm) | Second electrode width W2 (mm) | Presence or absence of second non-connection line | Occupancy rate C2 | C2 × W2 | (C2 × W2)/W1 | Detection sensitivity |
|---|---|---|---|---|---|---|---|
| Example 1 | 2.0 | 4.0 | Presence | 0.75 | 3.0 | 1.5 | A |
| Example 2 | 2.0 | 4.0 | Presence | 0.50 | 2.0 | 1.0 | B |
| Example 3 | 2.0 | 4.0 | Presence | 0.60 | 2.4 | 1.2 | A |
| Example 4 | 2.0 | 4.0 | Presence | 0.80 | 3.2 | 1.6 | A |
| Example 5 | 2.0 | 5.0 | Presence | 0.80 | 4.0 | 2.0 | B |
| Example 6 | 2.0 | 4.0 | Presence | 0.40 | 1.6 | 0.80 | C |
| Example 7 | 2.0 | 5.0 | Presence | 0.90 | 4.5 | 2.3 | C |
| Comparative Example 1 | 2.0 | 4.0 | Absence | 1.0 | 4.0 | 2.0 | D |
| Comparative Example 2 | 4.0 | 2.0 | Presence | 0.50 | 1.0 | 0.25 | D |

As shown in Table 1, in Examples 1 to 7, evaluation of the detection sensitivity for a touch operation was all "C" or higher, and excellent detection sensitivity could be obtained. In particular, in Examples 1, 3, and 4, evaluation of the detection sensitivity for a touch operation was "A", and a touch panel having excellent detection sensitivity could be obtained.

On the other hand, in Comparative Examples 1 and 2, evaluation of the detection sensitivity was "D".

In Examples 1, 3, and 4 in which the evaluation of the detection sensitivity for a touch operation was "A", the second sensing electrode SE2 has the plurality of non-connection lines NL, the second electrode width W2 is larger than the first electrode width W1, and the value of the effective electrode width ratio WR obtained by dividing the product of the second electrode width W2 and the occupancy rate C2 by the first electrode width W1 satisfies Expression (2).

In Examples 1, 3, and 4, it is considered that since the second sensing electrode SE2 has the plurality of non-connection lines NL and the second electrode width W2 is larger than the first electrode width W1, while reducing a parasitic capacitance in the second sensing electrode SE2, the second sensing electrode SE2 shielded an electromagnetic wave generated due to an operation of an LCD in an electrode intersection portion where the first sensing electrode SE1 and the second sensing electrode SE2 are overlapped with each other, and noise in a detection signal for a touch operation could be reduced. Moreover, in Examples 1, 3, and 4, it is considered that since the occupancy rate C2 is set to an appropriate value so as to satisfy Expression (2) and the total area of the second electrode line EL2 in the second sensing electrode SE2 is adjusted, the parasitic capacitance in the second sensing electrode SE2 could be further reduced.

Therefore, in Examples 1, 3, and 4, it is considered that the detection sensitivity for a touch operation was improved, the evaluation was "A", and thus a very excellent touch panel could be obtained.

In addition, in Examples 2 and 5 in which the evaluation of the detection sensitivity for a touch operation was "B", the second sensing electrode SE2 has the plurality of non-connection lines NL, the second electrode width W2 is larger than the first electrode width W1, and the value of the effective electrode width ratio WR obtained by dividing the product of the second electrode width W2 and the occupancy rate C2 by the first electrode width W1 does not satisfy Expression (2) but satisfies Expression (1).

In Examples 2 and 5, similarly to Examples 1, 3, and 4, it is considered that since the second sensing electrode SE2 has the plurality of non-connection lines NL and the second electrode width W2 is larger than the first electrode width W1, while reducing a parasitic capacitance in the second sensing electrode SE2, the second sensing electrode SE2 shielded an electromagnetic wave generated due to an operation of an LCD in an electrode intersection portion where the first sensing electrode SE1 and the second sensing electrode SE2 are overlapped with each other, and noise in a detection signal for a touch operation could be reduced. Moreover, in Examples 2 and 5, it is considered that since the occupancy rate C2 is set to an appropriate value so as to satisfy Expression (1), the parasitic capacitance in the second sensing electrode SE2 could be further reduced. Therefore, in Examples 2 and 5, it is considered that the evaluation of the detection sensitivity was "B", and thus an excellent touch panel could be obtained.

In addition, in Example 6 in which the evaluation of the detection sensitivity for a touch operation was "C", it is considered that since the value of the effective electrode width ratio WR obtained by dividing the product of the second electrode width W2 and the occupancy rate C2 by the first electrode width W1 is 0.80, which is less than a lower limit of Expression (1), due to the occupancy rate C2 of 0.40, but the second sensing electrode SE2 has the plurality of non-connection lines NL and the second electrode width W2 is larger than the first electrode width W1, while reducing a parasitic capacitance in the second sensing electrode SE2, the second sensing electrode SE2 shielded an electromagnetic wave generated due to an operation of an LCD in an electrode intersection portion where the first sensing electrode SE1 and the second sensing electrode SE2 are overlapped with each other, and noise in a detection signal for a touch operation could be reduced. Therefore, in Example 6, it is considered that the evaluation of the detection sensitivity for a touch operation was "C", and thus a touch panel without a problem in practical use could be obtained.

In addition, in Example 7 in which the evaluation of the detection sensitivity for a touch operation was "C", it is considered that since the value of the effective electrode width ratio WR obtained by dividing the product of the second electrode width W2 and the occupancy rate C2 by the first electrode width W1 is 2.3, which exceeds an upper limit of Expression (1), due to the occupancy rate C2 of 0.90, but the second sensing electrode SE2 has the plurality of non-connection lines NL and the second electrode width W2 is larger than the first electrode width W1, while reducing a parasitic capacitance in the second sensing electrode SE2, the second sensing electrode SE2 shielded an electromagnetic wave generated due to an operation of an LCD in an electrode intersection portion where the first sensing electrode SE1 and the second sensing electrode SE2 are overlapped with each other, and noise in a detection signal for a touch operation could be reduced. Therefore, in Example 7, it is considered that the evaluation of the detection sensitivity for a touch operation was "C", and thus a touch panel without a problem in practical use could be obtained.

Furthermore, in Comparative Example 1 in which the evaluation of the detection sensitivity for a touch operation was "D", it is considered that since the second electrode width W2 of the second sensing electrode SE2 is larger than the first electrode width W1 of the first sensing electrode SE1, the second sensing electrode SE2 shielded an electromagnetic wave generated due to an operation of an LCD in an electrode intersection portion where the first sensing electrode SE1 and the second sensing electrode SE2 are overlapped with each other, and noise in a detection signal for a touch operation could be reduced. However, in Comparative Example 1, it is considered that since the second sensing electrode SE2 does not have the non-connection line NL, and the second electrode width W2 of the second sensing electrode SE2 is made larger than the first electrode width W1 of the first sensing electrode SE1 due to the occupancy rate C2 of 1.0, a parasitic capacitance in the second sensing electrode SE2 was increased, the detection sensitivity for a touch operation was reduced, the evaluation was "D", and thus a touch panel with a problem in practical use could be obtained.

In addition, in Comparative Example 2 in which the evaluation of the detection sensitivity for a touch operation was "D", it is considered that since the second electrode width W2 of the second sensing electrode SE2 is larger than the first electrode width W1 of the first sensing electrode SE1, the second sensing electrode SE2 could not sufficiently shield an electromagnetic wave generated due to an operation of an LCD in an electrode intersection portion where the first sensing electrode SE1 and the second sensing electrode SE2 are overlapped with each other, and noise in a detection signal for a touch operation could not be reduced. Therefore, in Comparative Example 2, it is considered that the detection sensitivity for a touch operation was reduced, the evaluation was "D", and thus a touch panel with a problem in practical use could be obtained.

As described above, it is understood that by setting the second electrode width W2 of the second sensing electrode SE2 to be larger than the first electrode width W1 of the first sensing electrode SE1 and providing the plurality of non-connection lines NL in the second sensing electrode SE2, a touch panel capable of improving the detection sensitivity for a touch operation is obtained. Moreover, it is understood that by satisfying Expression (1) and Expression (2), a touch panel capable of improving the detection sensitivity for a touch operation is obtained.

EXPLANATION OF REFERENCES 1, 31, 33: touch panel
1A: front surface
1B: back surface
2: cover panel
3: conductive member for touch panel
4, 35: adhesive layer
5: transparent insulating substrate 5A: first surface
5B: second surface
6A: first electrode layer
6B: second electrode layer
7A, 7B: protective layer
7C: transparent insulating layer
12: first edge part wire
13: first external connection terminal
14: first electrode pad
22: second edge part wire
23: second external connection terminal
24: second electrode pad
32: transparent insulating substrate
34A: first transparent insulating substrate
34B: second transparent insulating substrate
C2: occupancy rate
D1: first direction
D2: second direction
DE1: first dummy electrode
DE2: second dummy electrode
EL1: first electrode line
EL2: second electrode line
G1, G2, G3: gap
MC1: first mesh cell
MC2: second mesh cell
MC3: third mesh cell
MP1: first mesh pattern
MP2: second mesh pattern
MP3: third mesh pattern
NL: non-connection line
P1: first mesh pitch
P2: second mesh pitch
P3: third mesh pitch
R0: region
S1: input region
S2: outer region
SE1: first sensing electrode
SE2: second sensing electrode
W1: first electrode width
W2: second electrode width
WR: effective electrode width ratio

What is claimed is:

1. A conductive member for a touch panel, comprising:
a first electrode layer and a second electrode layer which are disposed via a transparent insulating member, the first electrode layer being disposed closer to a touch surface side compared to the second electrode layer,
wherein the first electrode layer includes a plurality of first sensing electrodes which are arranged in parallel at an interval in a first direction and extend along a second direction orthogonal to the first direction, and a plurality of first electrode pads which are connected to the respective first sensing electrodes,
each of the first sensing electrodes is constituted by a plurality of first electrode lines formed with fine metal wires, which are electrically connected to each of the first electrode pads, and has a first electrode width W1 in the first direction,
the second electrode layer includes a plurality of second sensing electrodes which are arranged in parallel at an interval in the second direction and extend along the first direction, and a plurality of second electrode pads which are connected to the respective second sensing electrodes,
each of the second sensing electrodes is constituted by a plurality of second electrode lines formed with fine metal wires, which are electrically connected to each of the second electrode pads, and a plurality of non-connection lines formed with fine metal wires, which are arranged to be insulated from the second electrode pad and the plurality of second electrode lines, and has a second electrode width W2 in the second direction,
the second electrode width W2 is larger than the first electrode width W1,
the first electrode layer further includes a plurality of first dummy electrodes which are arranged between the plurality of first sensing electrodes so as to be electrically insulated from the plurality of first sensing electrodes, and are constituted by fine metal wires,
the second electrode layer further includes a plurality of second dummy electrodes which are arranged between the plurality of second sensing electrodes so as to be electrically insulated from the plurality of second sensing electrodes, and are constituted by fine metal wires, and
in a region where the first electrode layer and the second electrode layer are overlapped with each other, the fine metal wires constituting the plurality of first sensing electrodes, the fine metal wires constituting the plurality of first dummy electrodes, the fine metal wires constituting the plurality of second sensing electrodes, the fine metal wires constituting the plurality of non-connection lines, and the fine metal wires constituting the plurality of second dummy electrodes are combined with each other to form a third mesh pattern constituted by a plurality of third mesh cells.

2. The conductive member for a touch panel according to claim 1,
wherein in a case where an occupancy rate of the plurality of second electrode lines, which is represented by a ratio of a total area of the plurality of second electrode lines to a total area of the plurality of second electrode lines and the plurality of non-connection lines in the second sensing electrode, is set to C2, $1.0 \leq (W2 \times C2)/W1 \leq 2.0$ is satisfied.

3. The conductive member for a touch panel according to claim 2,
wherein $1.2 \leq (W2 \times C2)/W1 \leq 1.6$ is further satisfied.

4. The conductive member for a touch panel according to claim 1,
wherein in each of the second sensing electrodes, the non-connection lines are surrounded by the second electrode lines.

5. The conductive member for a touch panel according to claim 3,
wherein in each of the second sensing electrodes, the non-connection lines are surrounded by the second electrode lines.

6. The conductive member for a touch panel according to claim 1,
wherein the first electrode layer has a first mesh pattern which is constituted by a plurality of first mesh cells formed with the fine metal wires constituting the plurality of first sensing electrodes and the fine metal wires constituting the plurality of first dummy electrodes, and
the second electrode layer has a second mesh pattern which is constituted by a plurality of second mesh cells formed with the fine metal wires constituting the plurality of second sensing electrodes, the fine metal wires constituting the plurality of non-connection lines, and the fine metal wires constituting the plurality of second dummy electrodes.

7. The conductive member for a touch panel according to claim 6, wherein the first mesh pattern has a first mesh pitch,
the second mesh pattern has a second mesh pitch, and
the third mesh pattern has a third mesh pitch smaller than the first mesh pitch and the second mesh pitch.

8. The conductive member for a touch panel according to claim 1,
wherein each of the third mesh cells has a shape of a quadrangle.

9. The conductive member for a touch panel according to claim 8,
wherein the quadrangle is a rhombus.

10. The conductive member for a touch panel according to claim 6,
wherein the first mesh cell and the second mesh cell are both rhombic and have the same shape.

11. A touch panel comprising the conductive member for a touch panel according to claim 1.

12. A touch panel, comprising:
a first electrode layer and a second electrode layer which are disposed via a transparent insulating member, and the first electrode layer being disposed closer to a touch surface side compared to the second electrode layer,
wherein the first electrode layer includes a plurality of first sensing electrodes which are arranged in parallel at an interval in a first direction and extend along a second direction orthogonal to the first direction, and a plurality of first electrode pads which are connected to the respective first sensing electrodes,
each of the first sensing electrodes is constituted by a plurality of first electrode lines formed with fine metal wires, which are electrically connected to each of the first electrode pads, and has a first electrode width W1 in the first direction,
the second electrode layer includes a plurality of second sensing electrodes which are arranged in parallel at an interval in the second direction and extend along the first direction, and a plurality of second electrode pads which are connected to the respective second sensing electrodes,
each of the second sensing electrodes is constituted by a plurality of second electrode lines formed with fine metal wires, which are electrically connected to each of the second electrode pads, and a plurality of non-connection lines formed with fine metal wires, which are arranged to be insulated from the second electrode pad and the plurality of second electrode lines, and has a second electrode width W2 in the second direction,
the second electrode width W2 is larger than the first electrode width W1,
the first electrode layer further includes a plurality of first dummy electrodes which are arranged between the plurality of first sensing electrodes so as to be electrically insulated from the plurality of first sensing electrodes, and are constituted by fine metal wires,
the second electrode layer further includes a plurality of second dummy electrodes which are arranged between the plurality of second sensing electrodes so as to be electrically insulated from the plurality of second sensing electrodes, and are constituted by fine metal wires, and
in a region where the first electrode layer and the second electrode layer are overlapped with each other, the fine metal wires constituting the plurality of first sensing electrodes, the fine metal wires constituting the plurality of first dummy electrodes, the fine metal wires constituting the plurality of second sensing electrodes, the fine metal wires constituting the plurality of non-connection lines, and the fine metal wires constituting the plurality of second dummy electrodes are combined with each other to form a third mesh pattern constituted by a plurality of third mesh cells.

13. A conductive member, comprising:
a first electrode layer and a second electrode layer which are disposed via a transparent insulating member,
wherein the first electrode layer includes a plurality of first sensing electrodes which are arranged in parallel at an interval in a first direction and extend along a second direction orthogonal to the first direction, and a plurality of first electrode pads which are connected to the respective first sensing electrodes,
each of the first sensing electrodes is constituted by a plurality of first electrode lines formed with fine metal wires, which are electrically connected to each of the first electrode pads, and has a first electrode width W1 in the first direction,
the second electrode layer includes a plurality of second sensing electrodes which are arranged in parallel at an interval in the second direction and extend along the first direction, and a plurality of second electrode pads which are connected to the respective second sensing electrodes,
each of the second sensing electrodes is constituted by a plurality of second electrode lines formed with fine metal wires, which are electrically connected to each of the second electrode pads, and a plurality of non-connection lines formed with fine metal wires, which are arranged to be insulated from the second electrode pad and the plurality of second electrode lines, and has a second electrode width W2 in the second direction,
the second electrode width W2 is larger than the first electrode width W1,
the first electrode layer further includes a plurality of first dummy electrodes which are arranged between the plurality of first sensing electrodes so as to be electrically insulated from the plurality of first sensing electrodes, and are constituted by fine metal wires,
the second electrode layer further includes a plurality of second dummy electrodes which are arranged between the plurality of second sensing electrodes so as to be electrically insulated from the plurality of second sensing electrodes, and are constituted by fine metal wires, and
in a region where the first electrode layer and the second electrode layer are overlapped with each other, the fine metal wires constituting the plurality of first sensing electrodes, the fine metal wires constituting the plurality of first dummy electrodes, the fine metal wires constituting the plurality of second sensing electrodes, the fine metal wires constituting the plurality of non-connection lines, and the fine metal wires constituting the plurality of second dummy electrodes are combined with each other to form a third mesh pattern constituted by a plurality of third mesh cells.

* * * * *